(12) United States Patent
Yu

(10) Patent No.: US 12,176,545 B2
(45) Date of Patent: *Dec. 24, 2024

(54) POSITIVE ELECTRODE PLATE AND RELATED ELECTROCHEMICAL ENERGY STORAGE APPARATUS AND DEVICE

(71) Applicant: CONTEMPORARY AMPEREX TECHNOLOGY (HONG KONG) LIMITED, Hong Kong (CN)

(72) Inventor: Yang Yu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 648 days.

This patent is subject to a terminal disclaimer.

(21) Appl. No.: 17/511,059

(22) Filed: Oct. 26, 2021

(65) Prior Publication Data
US 2022/0109159 A1 Apr. 7, 2022

Related U.S. Application Data

(63) Continuation of application No. PCT/CN2020/106471, filed on Jul. 31, 2020.

(30) Foreign Application Priority Data

Aug. 8, 2019 (CN) .......................... 201910730972.9

(51) Int. Cl.
*H01M 4/62* (2006.01)
*H01M 4/02* (2006.01)

(52) U.S. Cl.
CPC ........... *H01M 4/625* (2013.01); *H01M 4/623* (2013.01); *H01M 4/626* (2013.01); *H01M 2004/021* (2013.01); *H01M 2004/028* (2013.01)

(58) Field of Classification Search
None
See application file for complete search history.

(56) References Cited

U.S. PATENT DOCUMENTS 11,158,859 B2 * 10/2021 Yu ..................... H01M 10/4235
11,894,524 B2 * 2/2024 Yu .......................... H01M 4/13
(Continued)

FOREIGN PATENT DOCUMENTS

| CN | 1606183 A | 4/2005 |
| CN | 103165863 A | 6/2013 |

(Continued)

OTHER PUBLICATIONS

Intention to Grant for EP application 20850999.2, dated May 10, 2024.

(Continued)

*Primary Examiner* — Amanda J Barrow
(74) *Attorney, Agent, or Firm* — Ladas & Parry LLP

(57) ABSTRACT

This application provides a positive electrode plate, including a positive current collector, a positive active material layer on at least one side of the positive current collector, and a safety layer between the positive active material layer and the positive current collector. The positive active material layer includes a positive active material. The safety layer includes a binding material, a conductive material, and an overcharge-sensitive material. The overcharge-sensitive material is a polymer that includes a monosaccharide structural unit and that includes at least one of a carbonate group and a phosphate group. An average diameter x of the conductive material and a weight-average molecular weight y of the overcharge-sensitive material satisfy Formula 1.

17 Claims, 3 Drawing Sheets

(56) References Cited

U.S. PATENT DOCUMENTS

| | | | | |
|---|---|---|---|---|
| 11,973,196 | B2 * | 4/2024 | Yu | H01M 4/62 |
| 12,040,455 | B2 * | 7/2024 | Yu | H01M 4/13 |
| 2014/0342200 | A1 | 11/2014 | Morita et al. | |
| 2018/0205115 | A1 * | 7/2018 | Haba | H01M 10/0525 |

FOREIGN PATENT DOCUMENTS

| | | | | |
|---|---|---|---|---|
| CN | 103168378 | A | 6/2013 | |
| CN | 105810885 | A | 7/2016 | |
| CN | 107112510 | A | 8/2017 | |
| CN | 108336356 | A | 7/2018 | |
| CN | 108470911 | A | 8/2018 | |
| CN | 109755462 | A | 5/2019 | |
| CN | 109755466 | A | 5/2019 | |
| CN | 110226250 | * | 9/2019 | H01M 10/052 |
| CN | 110444764 | A | 11/2019 | |
| JP | 2013182778 | A | 9/2013 | |
| JP | 2018113151 | A | 7/2018 | |
| KR | 20180065167 | A | 6/2018 | |
| WO | 2019022541 | A2 | 1/2019 | |
| WO | WO 2019/022541 | * | 1/2019 | H01M 4/13 |

OTHER PUBLICATIONS

Mei Xu et al. "Comparative Study on Molecular Weight of Konjac Glucomannan by Gel Permeation Chromatography-Laser Light Scattering-Refractive Index and Laser Light-Scattering Methods", Journal of Spectroscopy, vol. 2013, Article ID 685698, pp. 1-4, Jan. 1, 2013.
ISR for International Application PCT/CN2020/106471 mailed Oct. 28, 2020.
Written Opinion for International Application PCT/CN2020/106471 mailed Oct. 28, 2020.
First OA of Chinese priority application mailed Jun. 2, 2020.
Extended European Search Report of counterpart Application EP20850999.2, mailed Feb. 16, 2022.

* cited by examiner

POSITIVE ELECTRODE PLATE AND RELATED ELECTROCHEMICAL ENERGY STORAGE APPARATUS AND DEVICE

CROSS-REFERENCE TO RELATED APPLICATIONS

This application is a continuation of International Patent Application No. PCT/CN2020/106471 filed on Jul. 31, 2021 which claims priority to Chinese Patent Application No. 201910730972.9 filed on Aug. 8, 2019. The aforementioned patent applications are incorporated herein by reference in their entirety.

TECHNICAL FIELD

This application relates to the electrochemical field, and in particular, to a positive electrode plate and related electrochemical energy storage apparatus and device.

BACKGROUND

A lithium-ion secondary battery is charged and discharged mainly by means of shuttling and movement of lithium ions between a positive active material and a negative active material. The lithium-ion secondary battery provides stable voltage and current during operation, and is green and environmentally friendly during operation, and therefore, is widely used in various electrical devices such as a mobile phone, a tablet computer, a notebook computer, an electric bicycle, and an electric vehicle.

The benefits brought by the lithium-ion secondary battery to mankind are accompanied with safety issues such as fires and explosions that occur occasionally during charge. Such issues pose a great threat to people's lives and property safety.

SUMMARY

In view of the foregoing disadvantages in the prior art, an objective of this application is to provide a positive electrode plate, a related electrochemical energy storage apparatus, and a related device to solve the problems in the prior art.

To fulfil the foregoing objective and other related objectives, an aspect of this application provides a positive electrode plate, including a positive current collector, a positive active material layer on at least one side of the positive current collector, and a safety layer between the positive active material layer and the positive current collector. The positive active material layer includes a positive active material. The safety layer includes a binding material, a conductive material, and an overcharge-sensitive material.

The overcharge-sensitive material is a polymer that includes a monosaccharide structural unit and that includes at least one of a carbonate group and a phosphate group.

An average diameter x of the conductive material and a weight-average molecular weight y of the overcharge-sensitive material satisfy Formula 1:

$$0.001 \leq x/y \leq 0.25 \quad \text{Formula 1}$$

where, x is in units of nm, and y is in units of 1.

Another aspect of this application provides an electrochemical energy storage apparatus, including the foregoing positive electrode plate.

The positive electrode plate according to this application may be used to form an electrochemical energy storage apparatus. When overcharge or abuse occurs during charge of the electrochemical energy storage apparatus, the overcharge-sensitive material can react chemically and degrade even under a relatively low temperature, thereby changing a physical structure of the material, detaching conductive material particles in the safety layer, and disrupting a conductive network in the safety layer. This sharply increases an internal resistance of the electrochemical energy storage apparatus, and blocks conduction of electrons between the positive current collector and the positive active material layer, and cuts off the charge current in time, effectively prevents thermal runaway of the electrochemical energy storage apparatus, thereby avoiding safety problems such as fires and explosions and improving overcharge safety performance of the electrochemical energy storage apparatus.

For positive temperature coefficient (PTC) materials that cause volume expansion depending on the change in crystallinity, the materials physically change under high temperature conditions. The physical changes are greatly affected by a preparation process of a material coating and a preparation process of the electrochemical energy storage apparatus. For example, factors such as temperature and coating speed in the preparation process of the material coating and an electrolytic solution in the electrochemical energy storage apparatus affect the crystallinity of the material uncontrollably. In addition, the PTC material is more dependent on resistance changes caused by a sharp rise of the battery temperature to a specific temperature value when a short circuit or overcharge occurs. If the overcharge occurs on an electrochemical energy storage apparatus that undergoes very rapid thermal runaway, the PTC material is much likely to stay unactuated without cutting off the charge current in time. Therefore, reliability of the PTC material is not ensured, and safety hazards exist. In contrast to a safety layer made of a conventional material, the safety layer made of an overcharge-sensitive material according to this application is more reliable, so that the electrochemical energy storage apparatus is safer.

According to another aspect, this application provides a battery module containing the foregoing electrochemical energy storage apparatus.

According to still another aspect, this application provides a battery pack containing the foregoing battery module.

According to yet another aspect, this application provides a device containing the foregoing electrochemical energy storage apparatus. The electrochemical energy storage apparatus may be used as a power supply of the device or as an energy storage unit of the device.

The battery module, the battery pack, and the device according to this application contain the electrochemical energy storage apparatus according to this application, and therefore, have at least the same advantages as the electrochemical energy storage apparatus according to this application.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

REFERENCE NUMERALS ARE AS FOLLOWS

Figure 1:
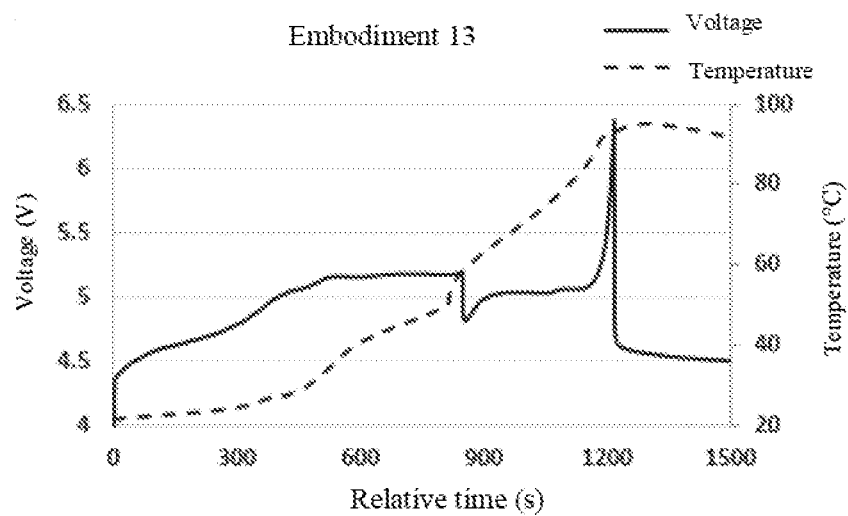
FIG. 1 is a schematic diagram of voltage and temperature changes of one battery in an overcharge safety performance test according to Embodiment 13 of this application.

1: Battery pack;
2: Upper box;
3: Lower box;
4: Battery module; and
5: Secondary battery.

DETAILED DESCRIPTION OF EMBODIMENTS

To make the objectives, technical solutions, and beneficial effects of this application clearer, the following describes this application in further detail with reference to embodiments. Understandably, the embodiments described in this specification are merely intended for interpreting this application but not intended to limit this application.

For brevity, merely a part of numerical ranges are explicitly disclosed herein. However, any lower limit may be combined with any upper limit to form an unspecified range, any lower limit may be combined with any other lower limit to form an unspecified range, and any upper limit may be combined with any other upper limit to form an unspecified range. In addition, although not explicitly stated, every point or a single numerical value between end points of a range is included in the range. Therefore, each point or a single numerical value may be used as a lower limit or upper limit of the range to combine with any other point or single numerical value or with any other lower or upper limit to form an unspecified range.

It needs to be noted that in the context herein, unless otherwise specified, a range defined by a numerical value qualified by "at least" or "at most" includes this numerical value, and the word "more" in the phrase "one or more of" means at least two.

The above summary of this application is not intended to describe every disclosed embodiment or every implementation of this application. The following description exemplifies illustrative embodiments in more detail. In several places throughout this application, guidance is provided through a series of embodiments. Such embodiments may be used in various combinations. In each instance, an enumerated list serves merely as a representative list, and is not to be construed as an exclusive list.

Positive Electrode Plate

A first aspect of this application provides a positive electrode plate, including a positive current collector, a positive active material layer on at least one side of the positive current collector, and a safety layer between the positive active material layer and the positive current collector. The positive active material layer includes a positive active material. The safety layer includes a binding material, a conductive material, and an overcharge-sensitive material.

The overcharge-sensitive material includes a monosaccharide structural unit and includes at least one of a carbonate group and a phosphate group.

An average diameter x of the conductive material and a weight-average molecular weight y of the overcharge-sensitive material satisfy Formula 1:

$0.001 \leq x/y \leq 0.25$  Formula 1 where, x is in units of nm, and y is in units of 1.

The positive electrode plate according to this application may be used to form an electrochemical energy storage apparatus. When the electrochemical energy storage apparatus is overcharged, the overcharge-sensitive material in the safety layer can react chemically and degrade under specific conditions (for example, overtemperature, overvoltage, and other conditions). Sugar unit fragments containing a carbonate group and/or a phosphate group, which are generated by degradation, can be quickly miscible with an electrolytic solution containing a large amount of carbonate solvent, and can transform from hardly freely movable macromolecular chains to a freely movable small-molecule solution or sol state, thereby actuating the conductive material in the safety layer to move together, disrupting a conductive network in the safety layer. Therefore, the ability of the ruptured and degraded overcharge-sensitive material to actuate the conductive network to disintegrate is critical to fulfillment of effects such as an overcharge protection response speed. The inventor of this application unexpectedly finds that the foregoing effects can be well exerted when a molecular weight of the overcharge-sensitive material and a particle size of the conductive material used in the safety layer satisfy a specific matching relationship. For example, an average diameter x of the conductive material and a weight-average molecular weight y of the overcharge-sensitive material may satisfy a relationship of $x/y \leq 0.25$ (x is in units of nm, and y is in units of 1). In the positive electrode plate according to this application, the average diameter of the conductive material generally refers to an average diameter of particles of the conductive material coated in the safety layer, as observed and measured with an electron microscope. For non-spherical particles, a mean value of major axis diameters and minor axis diameters is the average diameter.

In some specific embodiments of this application, the average diameter x of the conductive material and the weight-average molecular weight y of the overcharge-sensitive material may satisfy $0.001 \leq x/y \leq 0.25$, $0.001 \leq x/y \leq 0.005$, $0.005 \leq x/y \leq 0.01$, $0.01 \leq x/y \leq 0.05$, $0.05 \leq x/y \leq 0.1$, $0.1 \leq x/y \leq 0.15$, $0.15 \leq x/y \leq 0.2$, or $0.2 \leq x/y \leq 0.25$. In the positive electrode plate according to this application, the conductive material with a smaller average diameter x is more likely to move when the overcharge-sensitive material is ruptured, so as to disconnect the conductive network. Therefore, optionally, the particle size of the conductive material itself is relatively small. In some specific embodiments of this application, the average diameter x of the conductive material may satisfy: $x \leq 600$ nm, $x \leq 500$ nn, $x \leq 400$ nn, $x \leq 300$ nm, $x \leq 200$ nm, or $x \leq 100$ nm.

In the positive electrode plate according to this application, when ruptured, the overcharge-sensitive material with a higher weight-average molecular weight y can more strongly actuate disconnection of the conductive network. The overcharge-sensitive material with a too low weight-average molecular weight y may be unable to stabilize the conductive network during normal operation. The overcharge-sensitive material with a too high weight-average molecular weight y may make it difficult for the overcharge-sensitive material to react chemically, and lead to a relatively long degradation time and a low response speed. In some specific embodiments of this application, the weight-average molecular weight y of the overcharge-sensitive material may satisfy: $2{,}000 \leq y \leq 20{,}000$, $2{,}000 \leq y \leq 3{,}000$, $3000 \leq y \leq 4{,}000$, $4{,}000 \leq y \leq 5000$, $5{,}000 \leq y \leq 6{,}000$, $6{,}000 \leq y \leq 8{,}000$, $8{,}000 \leq y \leq 10{,}000$, $10{,}000 \leq y \leq 12{,}000$, $12{,}000 \leq y \leq 14{,}000$, $14{,}000 \leq y \leq 16.000$, $16{,}000 \leq y \leq 18{,}000$, or $18{,}000 \leq y \leq 20{,}000$.

In the positive electrode plate according to this application, the overcharge-sensitive material may include a monosaccharide structural unit, and may include at least one of a carbonate group and a phosphate group. In this way, under specific conditions (for example, temperature, voltage, and other conditions), the overcharge-sensitive material can react chemically and degrade to generate substances of sugar unit fragments that contain carbonate groups and/or phosphate groups. In some specific embodiments of this application, the overcharge-sensitive material may be at least one of a sugar carbonate, a sugar phosphate, and a mixed ester of a sugar carbonate and a sugar phosphate. The sugar carbonate generally means an ester formed by substituting at least a part of hydroxyls in a sugar molecule with carbonic acid groups. A molecular structure of the sugar carbonate generally includes carbonate groups. The sugar phosphate generally means an ester formed by substituting at least a part of hydroxyls in a sugar molecule with phosphoric acid groups. A molecular structure of the sugar phosphate generally includes phosphate groups. The mixed ester of a sugar carbonate and a sugar phosphate generally means an ester formed by substituting at least a part of hydroxyls in a sugar molecule with both carbonic and phosphoric acid groups. A molecular structure of the mixed ester of a sugar carbonate and a sugar phosphate generally includes carbonate groups and phosphate groups. In the molecular structure of the overcharge-sensitive material, the carbonic acid group and/or the phosphoric acid group may serve as crosslinking groups to connect a plurality of monosaccharide molecules and/or polysaccharide molecules (for example, may react with a plurality of hydroxyl groups belonging to different sugar molecules, to generate carbonate groups and phosphate groups), so as to form some bulk phase space structures. Alternatively, outer ends of a part of unsubstituted carbonic acids and/or phosphoric acids may be exposed. Further, as the case may be, an alkyl group (for example, an alkyl group whose chain length is C1 to C5) may be selected for capping. In this way, the conductive network in the safety layer can be more stabilized during normal operation, more noticeable structural changes occur when degradation occurs, and the overcharge protection response speed is increased. To a person skilled in the art, it is known that crosslinkability of the overcharge-sensitive material is generally appropriate so long as an overcharge protection layer can be properly prepared. In the overcharge-sensitive material, the monosaccharide structural unit also provides sites for the carbonate esterification and phosphate esterification of sugar molecules. Carbonate groups and phosphate groups are in high affinity with common electrolytic solutions, and highly effective in coordinating $Li^+$. In addition, the small-molecule sugar units and carbonate or phosphate fragments generated by ruptures can be quickly miscible with the electrolytic solution containing a large amount of carbonate solvent, thereby increasing the overcharge protection response speed.

In the positive electrode plate according to this application, the overcharge-sensitive material may be an ester formed by monosaccharide, polysaccharide (including oligosaccharide), or a mixture of both monosaccharide and polysaccharide. Monosaccharide generally means sugar that cannot be further hydrolyzed. A molecular structure of monosaccharide generally includes 3 to 6 carbon atoms. Polysaccharide generally means a sugar chain containing at least two monosaccharide units (for example, 2 to 10, 2, 3, 4, 5, 6, 7, 8, 9, 10, or more than 10 monosaccharide units) bonded by a glycosidic bond. As an overcharge-sensitive material, the polysaccharide is optionally oligosaccharide containing 2 to 10 monosaccharide structural units, so as to ensure that the weight-average molecular weight of the overcharge-sensitive material is appropriate.

Further, in the positive electrode plate according to this application, the overcharge-sensitive material may be a sugar carbonate. Compared with other materials (such as phosphate), the carbonate is more compatible with the electrolytic solution. In some specific embodiments of this application, the overcharge-sensitive material may be one of or any combination of a monosaccharide carbonate, a polysaccharide carbonate, a carbonate of a mixture of monosaccharide and polysaccharide, and the like.

In the positive electrode plate according to this application, the conductive material in the safety layer generally ensures that the safety layer is somewhat conductive. When the overcharge-sensitive material degrades, the conductive material in the safety layer can move as actuated by the generated sugar unit fragments containing the carbonate group and/or the phosphate group, thereby disrupting the conductive network in the safety layer. The conductive material in the safety layer may include one or more of a metallic conductive material, a carbon-based conductive material, a polymer conductive material, and the like. A person skilled in the art may select an appropriate type of metallic conductive material, carbon-based conductive material, and polymer conductive material. For example, the metallic conductive material may be one of or any combination of aluminum, an aluminum alloy, copper, a copper alloy, nickel, a nickel alloy, titanium, silver, and the like. For another example, the carbon-based conductive material may be one of or any combination of Ketjen black, mesocarbon microbead, activated carbon, graphite, conductive carbon black, acetylene black, carbon fiber, carbon nanotube, graphene, and the like. For another example, the polymer conductive material may be one of or any combination of polysulfur nitride, an aliphatic conjugated polymer, an aromatic cyclic conjugated polymer, an aromatic heterocyclic conjugated polymer, and the like.

In some optional embodiments of this application, the conductive material may be a carbon-based conductive material. By virtue of a relatively low density and a relatively high conductivity, a small amount of added carbon-based conductive material can satisfy conductivity requirements of the safety layer for a purpose of normal use of the electrochemical energy storage apparatus. In addition, the carbon-based conductive material can move easily in parallel with the degradation of the overcharge-sensitive material to disrupt the conductive network, thereby improving overcharge protection reliability. In some exemplary embodiments of this application, the conductive material is a zero-dimensional carbon-based conductive material, so as to reduce a random bridging effect of the conductive material in an overcharge protection response. In some more exemplary embodiments of this application, the conductive material may be zero-dimensional conductive carbon black. The zero-dimensional conductive carbon black is highly conductive, and can achieve a small particle size easily.

In the positive electrode plate according to this application, the overcharge-sensitive material can react chemically under specific conditions (for example, temperature, voltage, and other conditions) to degrade, thereby generating substances of sugar unit fragments that contain carbonate groups and/or phosphate groups. In the positive electrode plate, the conditions of degradation of the overcharge-sensitive material usually correspond to the conditions of overcharge of the positive electrode plate or the electrochemical energy storage apparatus. Specific conditions of overcharge may vary between different positive electrode plates or electrochemical energy storage apparatuses. The conditions of degradation of the overcharge-sensitive material are somewhat related to the temperature and overcharge voltage. For example, when an operating temperature of the positive electrode plate is relatively high, the overcharge-sensitive material will degrade when the voltage reaches a relatively low overcharge voltage, so as to ensure safe operation of the electrochemical energy storage apparatus. For another example, if overcharge occurs when the operating temperature of the positive electrode plate is relatively low, the overcharge-sensitive material may start to degrade when the voltage reaches a relatively high overcharge voltage and the temperature rises in local regions. However, the overall temperature of the positive electrode plate is much lower than that of the positive electrode plate made of a conventional PTC material. The specific degradation voltage and degradation temperature of the overcharge-sensitive material may be adjusted according to actual needs. In some specific embodiments of this application, the overcharge-sensitive material degrades when the positive electrode plate is under conditions of a charge voltage $\alpha$ V and a temperature $\beta$° C., where $4.2 \leq \alpha \leq 5.5$, $4.2 \leq \alpha \leq 4.5$, $4.5 \leq \alpha \leq 4.8$, $4.8 \leq \alpha \leq 5.2$, or $5.2 \leq \alpha \leq 5.5$, $35 \leq \beta \leq 80$, $35 \leq \beta \leq 40$, $40 \leq \beta \leq 45$, $45 \leq \beta \leq 50$, $50 \leq \beta \leq 55$, $55 \leq \beta \leq 60$, $60 \leq \beta \leq 65$, $65 \leq \beta \leq 70$, $70 \leq \beta \leq 75$, or $75 \leq \beta \leq 80$. The positive electrode plate that falls within the foregoing values of $\alpha$ and $\beta$ ensures normal operation under a normal voltage and a normal temperature, and also ensures the reliability of the overcharge protection performance.

In the positive electrode plate according to this application, the binding material in the safety layer is generally configured to ensure that the safety layer is closely connected to the current collector and the positive active material layer. Generally, the binding material is any of various binders applicable to preparation of a positive electrode plate in this field. For example, the binding material may be one of or any combination of polyvinylidene difluoride, a vinylidene difluoride-hexafluoropropylene copolymer, polyurethane, polyacrylonitrile, polyimide, epoxy resin, organosilicon resin, an ethylene-vinyl acetate copolymer, styrene butadiene rubber, styrene-acrylic rubber, polyacrylic acid, a polyacrylic acid-acrylate copolymer, a polyethylene-acrylate copolymer, and the like. In some optional embodiments of this application, the binding material is one of or any combination of polyvinylidene difluoride, a vinylidene difluoride-hexafluoropropylene copolymer, and the like. The binding substance in the safety layer generally needs to account for an appropriate percentage to ensure normal operation of the safety layer. However, a too high percentage of the binding material may hinder the disintegration of the conductive network when the overcharge-sensitive material degrades. In some specific embodiments of this application, the mass percent of the binding material in relation to a total mass of the safety layer is 30% to 60%, 30% to 35%, 35% to 40%, 40% to 45%, 45% to 50%, 50% to 55%, or 55% to 60%.

In the positive electrode plate according to this application, the content of the overcharge-sensitive material generally needs to be in an appropriate ratio to the content of the conductive material in the safety layer to ensure the appropriate conductivity of the safety layer during normal operation and the ability of the safety layer to disconnect the conductive network in a case of overcharge. If the content of the overcharge-sensitive material is too low or is in a too high ratio to the content of the conductive material, even the degradation of the overcharge-sensitive material may be unable to effectively actuate disconnection of the conductive network. In the positive electrode plate according to this application, when the mass ratio of the overcharge-sensitive material to the conductive material in the safety layer is not less than 2:1, the positive electrode plate can exert the effect of overcharge protection more noticeably. When the overcharge-sensitive material that satisfies such a ratio degrades and ruptures, the conductive material is quickly actuated to move to disrupt the conductive network. In some specific embodiments of this application, the mass ratio of the overcharge-sensitive material to the conductive material in the safety layer may be greater than or equal to 2, greater than or equal to 3, greater than or equal to 4, or greater than or equal to 5.

In addition, when the content of the overcharge-sensitive material and the content of the conductive material in the safety layer falls within the specified range, the appropriate conductivity of the safety layer during normal operation can be ensured more reliably. In some specific embodiments of this application, the mass percent of the overcharge-sensitive material in relation to the total mass of the safety layer is 30% to 50%, 30% to 35%, 35% to 40%, 40% to 45%, or 45%-50%. In other specific embodiments of this application, the mass percent of the conductive material in relation to the total mass of the safety layer is 6% to 18%, 6% to 8%, 8% to 10%, 10% to 12%, 12% to 14%, 14% to 16%, or 16% to 18%.

In the positive electrode plate according to this application, at least one surface of the positive current collector is coated with a positive active material layer. In a specific embodiment of this application, one surface or both surfaces of the positive current collector may be coated with the positive active material layer. It needs to be noted that, because the safety layer is disposed between the positive current collector and the positive active material layer, the quantity of the safety layers is generally identical to the quantity of the positive active material layers. To be specific, if one surface of the positive current collector is coated with the positive active material layer, one safety layer exists; or, if both surfaces of the positive current collector are coated with the positive active material layer, two safety layers exist. Generally, the positive current collector may be a layered structure. One surface or both surfaces of the positive current collector are coated with the positive active material layer. A safety layer is disposed between the positive active material layer on at least one of the surfaces and the positive current collector. The positive current collector is generally a structure or part capable of collecting current. The positive current collector may be any of various materials suitable for use as a positive current collector of an electrochemical energy storage apparatus in this field. For example, the positive current collector may be, but is not limited to, a metal foil. More specifically, the positive current collector may be, but is not limited to, a copper foil or an aluminum foil.

In the positive electrode plate according to this application, generally, the positive active material may be any of various materials suitable for use as a positive active material on a positive electrode plate in the electrochemical energy storage apparatus in this field. For example, the positive active material may include a compound like a lithium manganese oxide. The compound like a lithium manganese oxide may be one of or any combination of, but without limitation, a lithium manganese oxide, a lithium nickel manganese oxide, a lithium nickel cobalt manganese oxide, and the like. The positive active material may further include various other materials suitable for use as a positive active material on a positive electrode plate in the electrochemical energy storage apparatus, for example, may include, but is not limited to, one of or any combination of lithium cobalt oxide, lithium ferrous phosphate, lithium iron phosphate, and the like. The positive active material layer generally may further include a binder, a conductive agent, and the like. The binder and the conductive agent suitable for preparing a positive active material layer of an electrochemical energy storage apparatus are known to a person skilled in the art. For example, the binder in the positive active material layer may be one of or any combination of styrene butadiene rubber (SBR), water-based acrylic resin (water-based acrylic resin), sodium carboxymethyl cellulose (CMC), polyvinylidene difluoride (PVDF), polytetrafluoroethylene (PTFE), an ethylene-vinyl acetate copolymer (EVA), polyvinyl alcohol (PVA), or polyvinyl butyral (PVB). For another example, the conductive agent in the positive active material may be one of or any combination of graphite, superconductive carbon, acetylene black, carbon black, Ketjen black, carbon dots, carbon nanotubes, graphene, carbon nanofibers, and the like.

A person skilled in the art may choose a suitable method to prepare the positive electrode plate. The positive active material layer generally may include a positive active material, a binder, a conductive agent, and the like. The method for preparing the positive electrode plate may specifically include the following steps: forming a slurry from the binding material, the conductive material, and the over-charge-sensitive material, coating the positive current collector with the slurry to make a positive current collector containing a safety layer; and forming a slurry by mixing the positive active material, the binder, and the conductive agent, and then coating the security layer with the slurry.

Electrochemical Energy Storage Apparatus

A second aspect of this application provides an electrochemical energy storage apparatus, including the positive electrode plate according to the first aspect of this application.

It needs to be noted that the electrochemical energy storage apparatus according to this application may be a super capacitor, a lithium-ion battery, a lithium metal battery, a sodium-ion battery, or the like. In this embodiment of this application, merely one example is shown in which the electrochemical energy storage apparatus is a lithium-ion battery, but this application is not limited to the example.

In a specific embodiment of this application, the electrochemical energy storage apparatus may be a lithium-ion battery. The lithium-ion battery may include a positive electrode plate, a negative electrode plate, a separator located between the positive electrode plate and the negative electrode plate, and an electrolytic solution. The positive electrode plate may be the positive electrode plate according to the first aspect of this application, The method for preparing the lithium-ion battery is known to a person skilled in the art. For example, the positive electrode plate, the separator, and the negative electrode plate may be a layered structure separately. The layered structure can be stacked sequentially after being cut to a target size, and may be wound to a target size to form a battery cell, and further, may be combined with the electrolytic solution to form a lithium-ion battery.

In the lithium-ion battery, the negative electrode plate generally includes a negative current collector and a negative active material layer located on a surface of the negative current collector. The negative active material layer generally includes a negative active material. Generally, the negative current collector may be a layered structure. One surface or both surfaces of the negative current collector are coated with the negative active material layer. The negative current collector is generally a structure or part that collects current. The negative current collector may be any of various materials suitable for use as a negative current collector of a lithium-ion battery in this field. For example, the negative current collector may be, but is not limited to, a metal foil or the like. More specifically, the negative current collector may be, but is not limited to, a copper foil or the like.

In the lithium-ion battery, the negative active material in the negative active material layer may be any of various materials suitable for use as a negative active material of a lithium-ion battery in this field, for example, may be, but is not limited to, one of or any combination of graphite, soft carbon, hard carbon, vapor grown carbon fiber, mesocarbon microbead, silicon-based material, tin-based material, lithium titanate oxide, other metals that can combine with lithium into an alloy, and the like. The graphite may be one of or any combination of artificial graphite, natural graphite, or modified graphite. The silicon-based material may be one of or any combination of simple-substance silicon, a silicon-oxygen compound, a silicon-carbon composite, a silicon alloy, or the like. The tin-based material may be one of or any combination of simple-substance tin, a tin-oxide compound, a tin alloy, or the like. The negative active material layer generally may further include a binder, a conductive agent, and the like. The binder and the conductive agent suitable for preparing a negative active material layer of an electrochemical energy storage apparatus are known to a person skilled in the art. For example, the binder in the negative active material layer may be one of or any combination of styrene butadiene rubber (SBR), water-based acrylic resin (water-based acrylic resin), sodium carboxymethyl cellulose (CMC), polyvinylidene difluoride (PVDF), polytetrafluoroethylene (PTFE), an ethylene-vinyl acetate copolymer (EVA), polyvinyl alcohol (PVA), or polyvinyl butyral (PVB). For another example, the conductive agent in the negative active material may be one of or any combination of graphite, superconductive carbon, acetylene black, carbon black, Ketjen black, carbon dots, carbon nanotubes, graphene, carbon nanofibers, and the like.

In the lithium-ion battery, the separator may be any of various materials suitable for use as a separator of a lithium-ion battery in this field. For example, the separator may be, but is not limited to, one of or any combination of polyethylene, polypropylene, polyvinylidene fluoride, aramid fiber, polyethylene terephthalate, polytetrafluoroethylene, polyacrylonitrile, polyimide, polyamide, polyester, natural fiber, and the like.

In the lithium-ion battery, the electrolytic solution may be any of various electrolytic solutions applicable to the lithium-ion battery in this field. For example, the electrolytic solution generally includes an electrolyte and a solvent. The electrolyte generally may include a lithium salt and the like.

More specifically, the lithium salt may be an inorganic lithium salt and/or an organic lithium salt or the like. Specifically, the lithium salt may be, but is not limited to, one of or any combination of $LiPF_6$, $LiBF_4$, $LiN(SO_2F)_2$ (LiFSI for short). $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, the concentration of the electrolyte may be within a range of 0.8 mot/L to 1.5 mol/L. The solvent may be any of various solvents applicable to the electrolytic solution of the lithium-ion battery in this field. The solvent of the electrolytic solution is generally a nonaqueous solvent, and optionally, an organic solvent. Specifically, the solvent may be, but is not limited to, one of or any combination of ethylene carbonate, propylene carbonate, butylene carbonate, pentene carbonate, dimethyl carbonate, diethyl carbonate, dipropyl carbonate, ethyl methyl carbonate, and the like, or a halogenated derivative thereof.

The following describes the implementation of this application with reference to specific embodiments. A person skilled in the art can easily learn about other advantages and effects of this application from the content disclosed in this specification. This application may also be implemented or applied in other different manners. Based on different viewpoints and application requirements, details in this specification may be modified or changed without departing from the spirit of this application.

It needs to be noted that unless otherwise explicitly specified herein, process equipment or apparatuses mentioned in the following embodiments are conventional equipment or apparatuses in the art.

In addition, understandably, unless otherwise specified herein, a combination of one or more method steps mentioned in this application does not preclude other method steps existent before or after the combination of steps, or preclude other method steps from being inserted between the explicitly mentioned steps. Further, understandably, unless otherwise specified herein, a combination or connection relationship between one or more devices/apparatuses mentioned herein does not preclude other devices/apparatuses existent before or after the combined devices/apparatuses, or preclude other devices/apparatuses from being inserted between two devices/apparatuses explicitly mentioned herein. Moreover, unless otherwise specified, reference numerals of the method steps are merely intended for ease of identification but not intended to limit the arrangement order of the method steps or limit the scope of applicability of this application. All changes or adjustments to the relative relationship between the reference numerals fall within the scope of applicability of this application to the extent that no substantive change is made to the technical content hereof.

Figure 3:
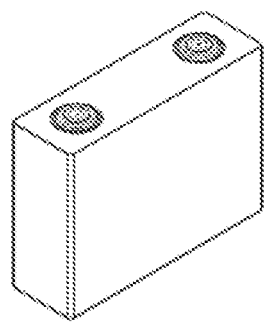
FIG. 3 is a schematic diagram of a secondary battery according to an embodiment.

In specific implementations of this application, the electrochemical energy storage apparatus is a secondary battery. The shape of the secondary battery is not limited in this application, and may be cylindrical, prismatic or of any other shape. FIG. 3 shows a prismatic secondary battery 5 as an example.

In some embodiments, the secondary battery may be assembled into a battery module. The battery module may contain a plurality of secondary batteries, and the specific quantity of the secondary batteries in a battery module may be adjusted according to the application requirements and capacity of the battery module.

Figure 4:
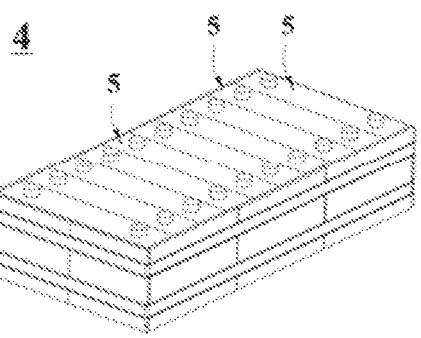
FIG. 4 is a schematic diagram of a battery module according to an embodiment.

FIG. 4 shows a battery module 4 as an example. Referring to FIG. 4, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a housing that provides an accommodation space. The plurality of secondary batteries 5 are accommodated in the accommodation space.

In some embodiments, the battery module may be assembled into a battery pack. The quantity of the battery modules contained in a battery pack may be adjusted according to the application requirements and the capacity of the battery pack.

Figure 5:
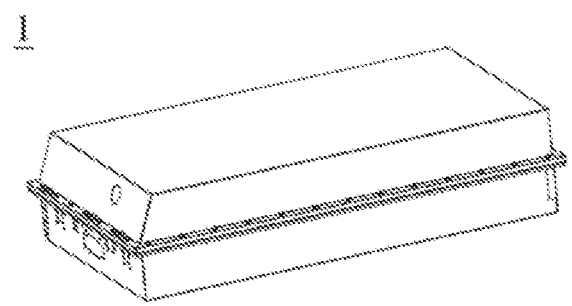
FIG. 5 is a schematic diagram of a battery pack according to an embodiment.
Figure 6:
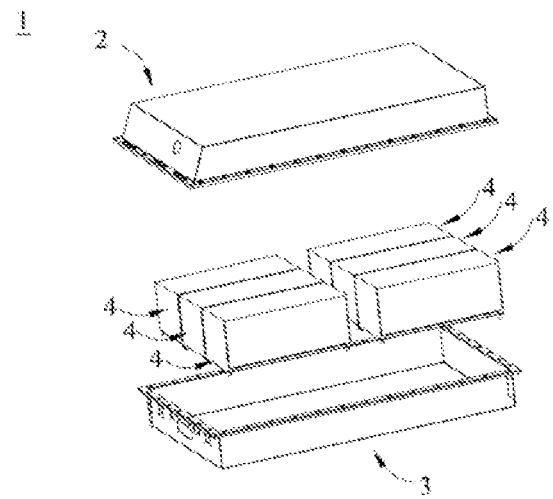
FIG. 6 is an exploded view of FIG. 5.

FIG. 5 and FIG. 6 show a battery pack 1 as an example. Referring to FIG. 5 and FIG. 6, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Another aspect of this application provides a device. The device includes the foregoing secondary battery. The secondary battery may be used as a power supply of the device and may also be used as an energy storage unit of the device. The device may be, but is not limited to, a mobile device (such as a mobile phone or a notebook computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

A secondary battery, a battery module, or a battery pack may be selected for use in the device according to the application requirements.

Figure 7:
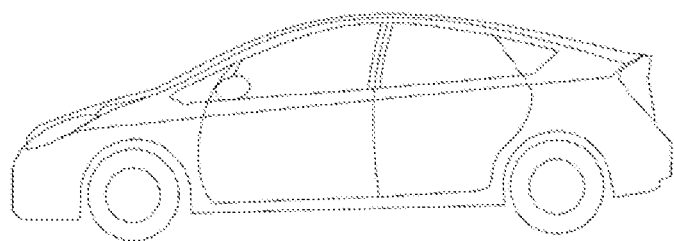
FIG. 7 is a schematic diagram of a device using a secondary battery as a power supply.

FIG. 7 shows a device as an example. The device is a battery electric vehicle, a hybrid electric vehicle, a plug-in hybrid electric vehicle, or the like. To meet the requirements of the device for high power and a high energy density of the secondary battery, a battery pack or a battery module may be used.

In another example, the device may be a mobile phone, a tablet computer, a notebook computer, or the like. The device is generally required to be thin and light, and may use a secondary battery as a power supply.

Embodiments 1~28

Preparing a Positive Electrode Plate:

Making a safety layer slurry: A method for making a safety layer slurry includes: placing a binding material, a conductive material, and an overcharge-sensitive material into a planetary mixing vessel, adding N-methyl-pyrrolidone (NMP) as a dispersing solvent that is 9 times the total weight of the binding material, the conductive material, and the overcharge-sensitive material; and stirring quickly for 5 hours to form a homogeneous and steady slurry. The type and mixing ratio of the selected binding material, conductive material, and overcharge-sensitive material are shown in Table 1. In the mixing ratio shown in Table 1, the weight percent of each material is a mass percent of the material in relation to the total mass of the binding material, the conductive material, and the overcharge-sensitive material. Parameters of the overcharge-sensitive material used in each embodiment are described below.

In the "glucose carbonate" in Embodiments 1~9, the degree of hydroxyl esterification is 0.9.

In the "sucrose carbonate" in Embodiments 10, the degree of hydroxyl esterification is 0.88.

In the "sucrose phosphate" in Embodiments 11, the degree of esterification is 0.92.

In the "mixed ester of a sucrose carbonate and a sucrose phosphate" in Embodiment 12, sucrose is esterified with carbonic acid until the weight-average molecular weight reaches 3.000 to 4,000 and the degree of esterification reaches 0.6, and then esterified with phosphoric acid until the degree of esterification reaches 0.9.

In the "carbonate of a mixture of glucose and sucrose" in Embodiments 13 and 17~28, the ratio of sucrose to glucose is 1:1, and the degree of hydroxyl esterification is 0.9.

In the "γ-cyclodextrin carbonate" in Embodiment 14, the degree of hydroxyl esterification is 0.9.

In the "degradable cellulose carbonate" in Embodiment 15, the degradable cellulose as an ingredient whose weight-average molecular weight is 1,300 is esterified with carbonic acid until a degree of hydroxyl esterification of 0.85, and fully capped with methyl groups.

In the "degradable chitosan carbonate" in Embodiment 16, the degradable chitosan as an ingredient whose weight-average molecular weight is 4,000 to 5.000 is esterified with carbonic acid until a degree of hydroxyl esterification of 0.85, and fully capped with methyl groups.

The method for preparing a positive electrode plate includes: vacuumizing the foregoing homogeneous and steady safety layer slurry, removing bubbles, coating one or both sides of the positive current collector with the safety layer slurry (for details of determining whether a single side or both sides are coated, see Table 1); and drying the slurry and obtaining a homogeneous and dense safety layer, where the thickness of a metallic conductive layer aluminum foil is 12 μm, the thickness of the safety layer is 3 μm in the case of single-side coating, and the thickness of the safety layer is 1.5 μm in the case of double-side coating.

Subsequently, the method for preparing a positive electrode plate further includes: dispersing $LiNi_{0.8}Co_{0.1}Mn_{0.1}O_2$ as a positive active material. Super-P as a conductive agent, and PVDF as a binder in an NMP solvent at a weight percent of 95:2:3, and stirring well to obtain a positive slurry; and coating a surface of the safety layer with the positive slurry evenly, and performing drying and cold calendering to obtain a positive electrode plate.

TABLE 1

| Serial number | Overcharge-sensitive material Type | Weight-average molecular weight | Content (%) | Conductive material Type | Average diameter (nm) | Content (%) | Ratio of average diameter x of conductive material to weight-average molecular weight of overcharge-sensitive material | Mass ratio of overcharge-sensitive material to conductive material | Binding material Type | Content (%) | Single side or double side |
|---|---|---|---|---|---|---|---|---|---|---|---|
| Embodiment 1 | Glucose carbonate | 10000 | 35 | Conductive carbon black (Super-P) | 50 | 10 | 0.005 | 3.5:1 | PVDF | 55 | Single |
| Embodiment 2 | Glucose carbonate | 2000 | 35 | Conductive carbon black (Super-P) | 100 | 10 | 0.05 | 3.5:1 | PVDF | 55 | Single |
| Embodiment 3 | Glucose carbonate | 3000 | 35 | Conductive carbon black (Super-P) | 200 | 10 | 0.067 | 3.5:1 | PVDF | 55 | Single |
| Embodiment 4 | Glucose carbonate | 3000 | 35 | Carbon fiber | 500 | 10 | 0.167 | 3.5:1 | PVDF | 55 | Single |
| Embodiment 5 | Glucose carbonate | 2000 | 35 | Carbon fiber | 500 | 10 | 0.25 | 3.5:1 | PVDF | 55 | Single |
| Embodiment 6 | Glucose carbonate | 10000 | 35 | Carbon fiber | 600 | 10 | 0.06 | 3.5:1 | PVDF | 55 | Single |
| Embodiment 7 | Glucose carbonate | 10000 | 35 | Conductive graphite | 1000 | 10 | 0.1 | 3.5:1 | PVDF | 55 | Single |
| Embodiment 8 | Glucose carbonate | 15000 | 35 | Conductive carbon black (Super-P) | 50 | 10 | 0.0033 | 3.5:1 | PVDF | 55 | Single |
| Embodiment 9 | Glucose carbonate | 20000 | 35 | Conductive carbon black (Super-P) | 20 | 10 | 0.001 | 3.5:1 | PVDF | 55 | Single |
| Embodiment 10 | Sucrose carbonate | 10000 | 35 | Conductive carbon black (Super-P) | 50 | 10 | 0.005 | 3.5:1 | PVDF | 55 | Single |
| Embodiment 11 | Sucrose phosphate | 10000 | 35 | Conductive carbon black (Super-P) | 50 | 10 | 0.005 | 3.5:1 | PVDF | 55 | Single |
| Embodiment 12 | Mixed ester of a sucrose carbonate and a sucrose phosphate | 10000 | 35 | Conductive carbon black (Super-P) | 50 | 10 | 0.005 | 3.5:1 | PVDF | 55 | Single |
| Embodiment 13 | Carbonate of a mixture of glucose and sucrose | 10000 | 35 | Conductive carbon black (Super-P) | 50 | 10 | 0.005 | 3.5:1 | PVDF | 55 | Single |
| Embodiment 14 | γ-cyclodextrin carbonate | 10000 | 35 | Conductive carbon black (Super-P) | 50 | 10 | 0.005 | 3.5:1 | PVDF | 55 | Single |
| Embodiment 15 | Degradable cellulase carbonate | 10000 | 35 | Conductive carbon black (Super-P) | 50 | 10 | 0.005 | 3.5:1 | PVDF | 55 | Single |
| Embodiment 16 | Degradable chitosan carbonate | 10000 | 35 | Conductive carbon black (Super-P) | 50 | 10 | 0.005 | 3.5:1 | PVDF | 55 | Single |

TABLE 1-continued

| | Overcharge-sensitive material | | Conductive material | | | Ratio of average diameter x of conductive material to weight-average molecular weight of overcharge-sensitive material | Mass ratio of overcharge-sensitive material to conductive material | Binding material | | Single side or double side |
|---|---|---|---|---|---|---|---|---|---|---|
| Serial number | Type | Weight-average molecular weight | Type | Average diameter (nm) | Content (%) | | | Type | Content (%) | |
| Embodiment 17 | Carbon of a mixture of glucose and sucrose | 10000 | Conductive carbon black (Super-P) | 50 | 10 | 0.005 | 1.8:1 | PVDF | 65 | Single |
| Embodiment 18 | Carbonate of a mixture of glucose and sucrose | 10000 | Conductive carbon black (Super-P) | 50 | 13 | 0.005 | 2.08:1 | PVDF | 60 | Single |
| Embodiment 19 | Carbonate of a mixture of glucose and sucrose | 10000 | Conductive carbon black (Super-P) | 50 | 6 | 0.005 | 6:1 | PVDF | 58 | Single |
| Embodiment 20 | Carbonate of a mixture of glucose and sucrose | 10000 | Conductive carbon black (Super-P) | 50 | 6 | 0.005 | 8.3:1 | PVDF | 44 | Single |
| Embodiment 21 | Carbonate of a mixture of glucose and sucrose | 10000 | Conductive carbon black (Super-P) | 50 | 18 | 0.005 | 3:1 | PVDF | 30 | Single |
| Embodiment 22 | Carbonate of a mixture of glucose and sucrose | 10000 | Conductive carbon black (Super-P) | 50 | 10 | 0.005 | 3.5:1 | SBR + CMC | 55 | Single |
| Embodiment 23 | Carbonate of a mixture of glucose and sucrose | 10000 | Conductive carbon black (Super-P) | 50 | 10 | 0.005 | 3.5:1 | Vinylidene difluoride-hexafluoropropylene copolymer | 55 | Single |
| Embodiment 24 | Carbonate of a mixture of glucose and sucrose | 10000 | Aluminum powder | 50 | 10 | 0.005 | 3.5:1 | PVDF | 55 | Single |
| Embodiment 25 | Carbonate of a mixture of glucose and sucrose | 10000 | Carbon nanotube | 200 | 10 | 0.02 | 3.5:1 | PVDF | 55 | Single |
| Embodiment 26 | Carbonate of a mixture of glucose and sucrose | 10000 | Mesocarbon microbead | 2000 | 10 | 0.2 | 3.5:1 | PVDF | 55 | Single |
| Embodiment 27 | Carbonate of a mixture of glucose and sucrose | 10000 | Acetylene black | 40 | 10 | 0.004 | 3.5:1 | PVDF | 55 | Single |
| Embodiment 28 | Carbonate of a mixture of glucose and sucrose | 10000 | Conductive carbon black (Super-P) | 50 | 10 | 0.005 | 3.5:1 | PVDF | 55 | Double |
| Comparative Embodiment 1 | Glucose carbonate | 3000 | Conductive graphite | 1000 | 10 | 0.33 | 3.5:1 | PVDF | 55 | Single |
| Comparative Embodiment 2 | / | / | / | / | / | / | / | / | / | / |
| Comparative Embodiment 3 | / | / | Conductive carbon black | 50 | 10 | / | / | PVDF | 90 | Single |

Note: embodiment 18, 19, 20, 21 content values are 27, 36, 50, 52 respectively.

TABLE 1-continued

| Serial number | Overcharge-sensitive material | | Conductive material | | | Ratio of average diameter x of conductive material to weight-average molecular weight of overcharge-sensitive material | Mass ratio of overcharge-sensitive material to conductive material | Binding material | | Single side or double side |
| | Type | Weight-average molecular weight | Con-tent (%) | Type | Average diameter (nm) | Con-tent (%) | | | Type | Con-tent (%) | |
| --- | --- | --- | --- | --- | --- | --- | --- | --- | --- | --- | --- |
| Comparative Embodiment 4 | Degradable cellulose | 10000 | 35 | Conductive carbon black | 50 | 10 | / | / | PVDF | 55 | Double |

Preparing a Negative Electrode Plate:

A method for preparing a negative electrode plate includes: dispersing artificial graphite as a negative active material. Super-P as a conductive agent, styrene butadiene rubber (SBR) as a binder, and sodium carboxymethyl cellulose (CMC) in a deionized water solvent at a weight ratio of 93:3:2:2, and stirring evenly to obtain a negative slurry; and coating two opposite sides of the negative current collector copper foil with the negative slurry, and performing drying and cold calendering to obtain a negative electrode plate.

Preparing an Electrolytic Solution:

A method for preparing an electrolytic solution includes: mixing ethylene carbonate (EC), propylene carbonate (PC), and dimethyl carbonate (DMC) evenly at a weight ratio of EC:PC:DMC=1:1:1 to obtain an organic solvent, dissolving lithium salt $LiPF_6$ in the organic solvent, and stirring evenly to obtain an electrolytic solution, in which a concentration of $LiPF_6$ is 1 mol/L.

Preparing a Lithium-Ion Secondary Battery:

A method for preparing a lithium-ion secondary battery includes: sequentially stacking the positive electrode plate, polyethylene porous separator, and the negative electrode plate, and winding them to obtain a battery cell; and then placing the battery cell into an outer package, injecting the electrolytic solution, and performing packaging to obtain a lithium-ion secondary battery.

Comparative Embodiment 1

The preparation method in Comparative Embodiment 1 is similar to that in Embodiment 7, but differs in that the weight-average molecular weight of the overcharge-sensitive material is 3.000, and the average diameter of the conductive material is 1,000 nm, that is, the ratio of the average diameter of the conductive material to the weight-average molecular weight of the overcharge-sensitive material=0.33.

Comparative Embodiment 2

The preparation method in Comparative Embodiment 2 is similar to that in Embodiment 1, but differs in that no safety layer is prepared in Comparative Embodiment 2, and both sides of the current collector are coated with the active material layer directly.

Comparative Embodiment 3

The preparation method in Comparative Embodiment 3 is similar to that in Embodiment 1, but differs in that, in the safety layer slurry, no overcharge-sensitive material is added, the weight percent of the binding material is 90%, and the weight percent of the conductive material is 10%.

Comparative Embodiment 4

The preparation method in Comparative Embodiment 4 is similar to that in Embodiment 28, but differs in that, in the safety layer slurry, the degradable cellulose whose weight-average molecular weight is also 10,000 replaces the overcharge-sensitive material.

Figure 2:
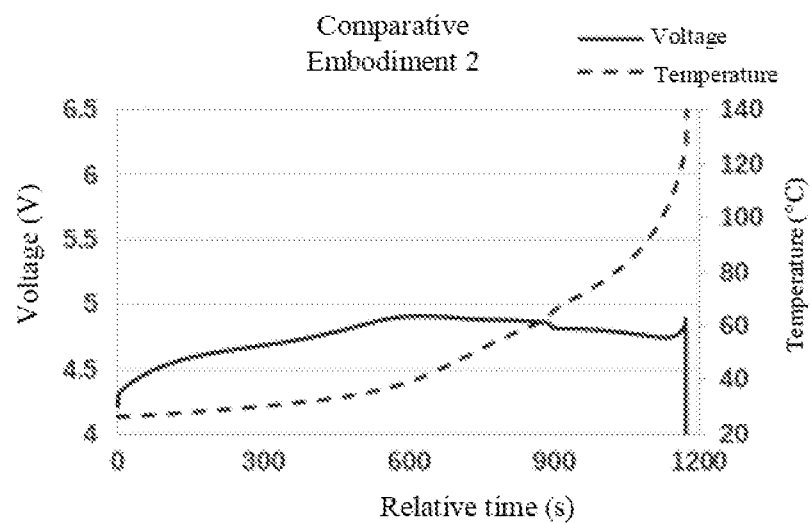
FIG. 2 is a schematic diagram of voltage and temperature changes of one battery in an overcharge safety performance test according to Comparative Embodiment 2 of this application.

Test Part (1) Testing Overcharge Safety Performance of the Lithium-Ion Secondary Battery The test method includes: charging the lithium-ion secondary battery at a temperature of 25±2° C. with a constant current of 1 C-rate until the voltage reaches 4.25 V, charging the battery at a constant voltage of 4.25 V until the current reaches 0.05 C, leaving the battery to stand for 30 minutes, fixing the battery with a clamp, and placing the battery on an overcharge safety test device where the ambient temperature is controlled to be 25±2° C.; leaving the battery to stand for 5 minutes, and overcharging the fully charged battery at a 1 C-rate and recording the real-time voltage and temperature changes of each battery until the battery catches fire or explodes or stops charging. In each embodiment and comparative embodiment, 6 batteries are picked for testing. The battery that does not catch fire or explode passes the test, and the battery that catches fire or explodes fails the test. Table 2 shows the test results of the overcharge safety performance test in the embodiments and comparative embodiments. In addition, FIG. 1 is a schematic diagram of voltage and temperature changes of one battery in an overcharge safety performance test according to Embodiment 13, and FIG. 2 is a schematic diagram of voltage and temperature changes of one battery in an overcharge safety performance test according to Comparative Embodiment 2.

(2) Testing Cycle Performance of the Lithium-Ion Secondary Battery

The test method includes: charging the lithium-ion secondary battery at a temperature of 45±2° C. with a constant current of 1 C until the voltage reaches 4.25 V. and then charging the battery at a constant voltage of 4.25 V until the current reaches 0.05 C: leaving the battery to stand for 5 minutes, and then discharging the battery at a constant current of 1 C until the voltage reaches 2.8 V thereby completing a cycle of charge and discharge, where the discharge capacity at this time is denoted as a first-cycle discharge capacity; and charging and discharging the lithium-ion secondary battery for 200 cycles according to the foregoing method, and recording the discharge capacity after each cycle:

Cycle capacity retention rate (%)=100th-cycle discharge capacity/first-cycle discharge capacity×100%.

Table 2 shows the test results of the cycle performance test in the embodiments and comparative embodiments.

The test results in Embodiments 1~28 and Comparative Embodiments 1~4 are shown in the following table:

TABLE 2

|  | Pass rate | 200th-cycle capacity retention rate at 45° C. |
|---|---|---|
| Embodiment 1 | 6/6 | 94.3% |
| Embodiment 2 | 4/6 | 94.1% |
| Embodiment 3 | 6/6 | 94.2% |
| Embodiment 4 | 3/6 | 94.0% |
| Embodiment 5 | 2/6 | 94.1% |
| Embodiment 6 | 4/6 | 94.0% |
| Embodiment 7 | 3/6 | 93.7% |
| Embodiment 8 | 6/6 | 94.4% |
| Embodiment 9 | 4/6 | 94.2% |
| Embodiment 10 | 6/6 | 93.9% |
| Embodiment 11 | 2/6 | 93.9% |
| Embodiment 12 | 4/6 | 94.1% |
| Embodiment 13 | 6/6 | 94.2% |
| Embodiment 14 | 6/6 | 94.0% |
| Embodiment 15 | 6/6 | 94.1% |
| Embodiment 16 | 6/6 | 94.3% |
| Embodiment 17 | 3/6 | 94.3% |
| Embodiment 18 | 6/6 | 94.1% |
| Embodiment 19 | 6/6 | 94.2% |
| Embodiment 20 | 6/6 | 94.0% |
| Embodiment 21 | 6/6 | 92.6% |
| Embodiment 22 | 6/6 | 94.1% |
| Embodiment 23 | 6/6 | 94.4% |
| Embodiment 24 | 2/6 | 93.9% |
| Embodiment 25 | 3/6 | 94.3% |
| Embodiment 26 | 3/6 | 94.1% |
| Embodiment 27 | 5/6 | 94.0% |
| Embodiment 28 | 6/6 | 94.0% |
| Comparative Embodiment 1 | 0/6 | 93.9% |
| Comparative Embodiment 2 | 0/6 | 92.9% |
| Comparative Embodiment 3 | 0/6 | 93.8% |
| Comparative Embodiment 4 | 0/6 | 93.5% |

As can be learned from the test results in Embodiments 1~28, the secondary batteries that use the positive electrode plate according to this application have passed the overcharge safety test at a high pass rate, and have an excellent 200-cycle capacity retention rate tested at 45° C. In addition, as can be seen from FIG. 1, when the positive electrode plate is overcharged, the temperature rises gradually. After the temperature reaches a specific temperature value, the overcharge-sensitive material in the safety layer degrades, thereby disrupting the conductive network. Consequently, the internal resistance of the electrochemical energy storage apparatus increases sharply, and the charge current is cut off in time.

The test result in Comparative Embodiment 1 shows that a too high x/y ratio leads to failure of the overcharge safety test.

The test result in Comparative Embodiment 2 shows that the secondary battery that uses a conventional positive electrode plate fails the overcharge safety test and has low 200th-cycle capacity retention rate tested at 45° C. In addition, as shown in FIG. 2, the battery heats up gradually after overcharge, and catches fire at the 1.200th second approximately after the overcharge.

The test result in Comparative Embodiment 3 shows that, using PVDF to replace the overcharge-sensitive material according to this application, the secondary battery fails the overcharge safety test.

The test result in Comparative Embodiment 4 shows that, when polysaccharides without carbonic acid groups or phosphoric acid groups replace the overcharge-sensitive material according to this application, no overcharge protection effect is achieved.

In conclusion, this application effectively overcomes various disadvantages in the prior art and is highly valuable in commercialization.

A person skilled in the art may make changes and modifications to the embodiments of this application based on the disclosure and teachings in this specification. Therefore, this application is not limited to the specific implementations disclosed and described above, and the modifications and changes made to this application fall within the protection scope of the claims of this application. In addition, although some specific terms are used in this specification, the terms are merely for ease of description but do not constitute any limitation on this application.

What is claimed is:

1. A positive electrode plate, comprising a positive current collector, a positive active material layer on at least one side of the positive current collector, and a safety layer between the positive active material layer and the positive current collector,
wherein the positive active material layer comprises a positive active material, and the safety layer comprises a binding material, a conductive material, and an overcharge-sensitive material;
the overcharge-sensitive material is a polymer that comprises a monosaccharide structural unit and that comprises at least one of a carbonate group and a phosphate group;
an average diameter x of the conductive material and a weight-average molecular weight y of the overcharge-sensitive material satisfy Formula 1:

$$0.001 \leq x/y \leq 0.25 \qquad \text{Formula 1}$$

wherein, x is in units of nm, and y is in units of 1; and
wherein the weight-average molecular weight of the overcharge-sensitive material satisfies $2{,}000 \leq y \leq 20{,}000$; and
wherein a mass percent of the binding material in relation to a total mass of the safety layer is 30% to 60%;
wherein, in the safety layer, a mass ratio of the overcharge-sensitive material to the conductive material is not less than 2:1;
wherein the average diameter x of the conductive material is measured with an electron microscope and is a mean value of major axis diameters and minor axis diameters.

2. The positive electrode plate according to claim 1, wherein the average diameter of the conductive material satisfies $x \leq 600$ nm.

3. The positive electrode plate according to claim 1, wherein the overcharge-sensitive materials includes a mixed ester of a sugar carbonate and a sugar phosphate.

4. The positive electrode plate according to claim 1, wherein the overcharge-sensitive material is one of
a polysaccharide carbonate, or
a mixture of a monosaccharide carbonate and a polysaccharide carbonate.

5. The positive electrode plate according to claim 1, wherein the conductive material is one of or any combination of a metallic conductive material, a carbon-based conductive material, and a polymer conductive material.

6. The positive electrode plate according to claim 1, wherein the metallic conductive material is one of or any combination of aluminum, an aluminum alloy, copper, a copper alloy, nickel, a nickel alloy, titanium, and silver; the carbon-based conductive material is one of or any combination of Ketjen black, mesocarbon microbead, activated carbon, graphite, conductive carbon black, acetylene black, carbon fiber, carbon nanotube, and graphene; and the polymer conductive material is one of or any combination of polysulfur nitride, an aliphatic conjugated polymer, an aromatic cyclic conjugated polymer, and an aromatic heterocyclic conjugated polymer.

7. The positive electrode plate according to claim 1, wherein the conductive material is zero-dimensional conductive particles.

8. The positive electrode plate according to claim 1, wherein the conductive material is zero-dimensional carbon-based conductive material particles.

9. The positive electrode plate according to claim 1, wherein the conductive material is zero-dimensional conductive carbon black.

10. The positive electrode plate according to claim 1, wherein the overcharge-sensitive material degrades when the positive electrode plate is under conditions of a charge voltage $\alpha$ V and a temperature $\beta$° C., wherein $4.2 \leq \alpha \leq 5.5$, and $35 \leq \beta \leq 80$.

11. The positive electrode plate according to claim 1, wherein the binding material is one of or any combination of polyvinylidene difluoride, a vinylidene difluoride-hexafluoropropylene copolymer, polyurethane, polyacrylonitrile, polyimide, epoxy resin, organosilicon resin, an ethylene-vinyl acetate copolymer, styrene butadiene rubber, styrene-acrylic rubber, polyacrylic acid, a polyacrylic acid-acrylate copolymer, and a polyethylene-acrylate copolymer.

12. The positive electrode plate according to claim 1, wherein the binding material is one of or any combination of polyvinylidene difluoride and a vinylidene difluoride-hexafluoropropylene copolymer.

13. The positive electrode plate according to claim 1, wherein, in the safety layer,
a mass percent of the overcharge-sensitive material in the total mass of the safety layer is 30% to 50%; and/or
a mass percent of the conductive material in the total mass of the safety layer is 6% to 18%.

14. An electrochemical energy storage apparatus, comprising a positive electrode plate, wherein the positive electrode plate comprises a positive current collector, a positive active material layer on at least one side of the positive current collector, and a safety layer between the positive active material layer and the positive current collector, the positive active material layer comprises a positive active material, and the safety layer comprises a binding material, a conductive material, and an overcharge-sensitive material;
the overcharge-sensitive material is a polymer that comprises a monosaccharide structural unit and that comprises at least one of a carbonate group and a phosphate group;
an average diameter x of the conductive material and a weight-average molecular weight y of the overcharge-sensitive material satisfy Formula 1:

$$0.001 \leq x/y \leq 0.25 \qquad \text{Formula 1}$$

wherein, x is in units of nm, and y is in units of 1; and
wherein the weight-average molecular weight of the overcharge-sensitive material satisfies $2{,}000 \leq y \leq 20{,}000$; and
wherein a mass percent of the binding material in relation to a total mass of the safety layer is 30% to 60%;
wherein, in the safety layer, a mass ratio of the overcharge-sensitive material to the conductive material is not less than 2:1;
wherein the average diameter x of the conductive material is measured with an electron microscope and is a mean value of major axis diameters and minor axis diameters.

15. A battery module, wherein the battery module comprises the electrochemical energy storage apparatus according to claim 14.

16. A battery pack, wherein the battery pack comprises the battery module according to claim 15.

17. A device, wherein the device comprises the electrochemical energy storage apparatus according to claim 14, and the device is one or more of an electric vehicle, an electric ship, an electric tool, an electronic device, and an energy storage system.

* * * * *